United States Patent [19]
Graff

[11] 3,972,129
[45] Aug. 3, 1976

[54] APPARAUS FOR THE ADSORPTION TREATMENT OF A GASEOUS MEDIUM

[76] Inventor: Roderich W. Graff, Kollwitzweg 19, 61 Darmstad-Arheilgen, Germany

[22] Filed: Nov. 4, 1974

[21] Appl. No.: 520,597

[30] Foreign Application Priority Data
Nov. 2, 1973 Germany............................ 2354745

[52] U.S. Cl. ...................................... 34/32; 34/80; 34/191
[51] Int. Cl.² ............................................ F26B 3/04
[58] Field of Search ................... 34/80, 23, 32, 191, 34/48; 55/62, 387

[56] References Cited
UNITED STATES PATENTS

| | | | |
|---|---|---|---|
| 2,955,673 | 10/1960 | Kennedy et al. | 55/62 |
| 2,992,703 | 7/1967 | Vasan et al. | 55/62 |
| 3,621,585 | 11/1971 | Robertson | 34/80 |
| 3,803,724 | 4/1974 | Bombich | 34/80 |

FOREIGN PATENTS OR APPLICATIONS

| | | | |
|---|---|---|---|
| 110,711 | 5/1944 | Sweden | 34/80 |

Primary Examiner—John J. Camby
Assistant Examiner—Larry I. Scwartz
Attorney, Agent, or Firm—Michael J. Striker

[57] ABSTRACT

An adsorption chamber is included into a conduit which further includes a blower and at least one heating arrangement; check valves are provided in the conduit which operate in dependence on the pressure conditions prevailing in the respective conduit sections. The blower may be operated in two mutually opposite directions, in one direction propelling the medium to be adsorption treated through the adsorption chamber, in the reversed direction propelling a regeneration medium through the adsorption chamber in counterflow. The adsorption chamber may be filled with two different adsorbents capable of adsorbing moisture in different temperature ranges. Thermostats may be provided for controlling the energization of the heating arrangement.

12 Claims, 3 Drawing Figures

APPARAUS FOR THE ADSORPTION TREATMENT OF A GASEOUS MEDIUM

BACKGROUND OF THE INVENTION

The present invention relates to an apparatus for adsorption treatment of a gaseous medium, and more particularly to an apparatus for adsorbing moisture from air used for drying synthetic plastic granulate in a supply container of an injection molding machine.

There are already known various apparatuses of the type here under discussion, which generally include an adsorption circuit which connects the supply container to an adsorption chamber filled with at least one regeneratable adsorbent in which the air or other gaseous medium to be used for drying the granulate in the supply container is deprived of moisture, and a regeneration circuit in which an additional adsorption chamber is interposed which is also filled with the regeneratable adsorbent which has been previously saturated with moisture and which is now regenerated by being traversed by hot air. When the firstmentioned adsorption chamber is saturated with moisture, it is included with the regeneration circuit, while the regenerated additional adsorption chamber is included into the adsorption circuit and, being traversed by the gaseous medium to be demoisturized, adsorbs moisture therefrom. The adsorption and regeneration circuits may either include separate blowers or other propelling devices for the gaseous medium to be dried and the regeneration medium, respectively, or a shared propelling device may be provided which propels the media through the respective circuits and the respective adsorption chambers. The transfer of the first-mentioned adsorption chamber into the regeneration circuit and of the additional adsorption chamber into the adsorption chamber, and vice versa upon saturation of the additional adsorption chamber, is accomplished by means of valves interposed into the adsorption and regeneration circuits. Heating devices are included in the circuits, which heat the gaseous medium to be dried to a temperature sufficient for drying the granulate in the supply container, and the regeneration medium to a regeneration temperature. The operation of the apparatus may be controlled in dependence on the temperatures prevailing in the respective circuits, and a sensing means may be provided in the respective circuits to sense the temperatures prevailing therein.

It will be appreciated that the above-discussed apparatus is rather complex and expensive in terms of capital investment and operating costs. More particularly, the valves which are needed for switching the two adsorption chambers between the two circuits are of a complex construction and difficult to manufacture and, consequently, rather expensive. The most important factor contributing to the complexity of the valves and their cost is that these valves must be so constructed as to under all circumstances prevent the humid air from entering the supply container.

SUMMARY OF THE INVENTION

Accordingly, it is a general object of the present invention to avoid the disadvantages of the prior-art apparatus.

More particularly, it is an object of the present invention to provide a relatively simple and inexpensive apparatus of the type here under discussion.

It is still another object of the present invention to provide an apparatus for the adsorption treatment of a gaseous medium which is reliable in operation and which requires a minimum amount of energy for its operation.

It is a concomitant object of the present invention to provide an apparatus for demositurizing air which may easily be adapted to different loads.

It is yet another object of the present invention to provide an apparatus for adsorbing moisture from air which is subsequently to be used for drying a synthetic plastic granulate in a supply container of an injection molding machine.

In pursuance of these objects and others which will become apparent hereinafter, one feature of the present invention resides in an apparatus for adsorption treatment of a gaseous medium which comprises a single adsorption chamber having an inlet and an outlet and accommodating at least one regeneratable adsorbent intermediate the inlet and the outlet. Conduits communicate with the inlet and the outlet, respectively, and a reversible blower is interposed in the conduits and propels the gaseous medium to be treated in the single adsorption chamber through the same in direction from the inlet to the outlet when the blower operates in one direction, and propels a regeneration medium through the single adsorption chamber in direction from the outlet to the inlet when the blower operates in the reversed direction. Valves are provided in the conduits which prevent the regeneration medium from entering the conduits when the blower operates in the one direction while permitting the gaseous medium to be treated to enter the conduits, and also prevents the gaseous medium to be treated from entering the conduits when the blower operates in the reversed direction while permitting the regeneration medium to enter the conduits. The valves may be simple check valves which alternatively open and close the various conduits in dependence on the pressures prevailing therein. In this manner, the entire change-over from the adsorption cycle to the regeneration cycle, and vice versa, may be accomplished by reversing the direction of operation of the blower, whereby the pressure conditions prevailing in the conduits are changed. The blowers especially suited for this kind of operation include radial-flow blowers or rotary piston blowers. As the sense of rotation of the blower is reversed, so are the pressure conditions in the conduits, the conduits downstream of the blower being at superatmospheric pressure while the pressure in the conduits upstream of the blower is subatmospheric, that is the conduits which have previously been at the superatmospheric pressure are now at subatmospheric pressure, and vice versa, so that the check valves interposed in the respective conduits are automatically influenced by the pressure in the respective conduits to close some of them and open others.

The cycle succession, that is the duration of the adsorption and regeneration phases of the cycle, is controlled in a known manner in that sensors are provided in the various conduits which measures the temperature of the media flowing therethrough so that, for instance, when the temperature of the regeneration medium downstream of the adsorption chamber then being regenerated exceeds a certain value which is indicative of the accomplishment of the regeneration process, the regeneration phase is terminated, and cool air is passed for a short period of time through the adsorption chamber in order to bring the temperature of the adsorbent within the limits in which it is capable of adsorbing the moisture from the gaseous medium to be treated.

Experience has shown that, when the adsorption apparatus according to the present invention is used in conjunction with a storage container for a synthetic plastic granulate or powder, and when the dimensions of the storage container and thus its storing capacity are selected sufficiently large, and when the storage container is well insulated, the drying process of the granulate or powder may be interrupted for a certain, relatively short, period of time without any adverse effects on the quality of the process being performed, for instance the injection molding process of an injection molding machine, since during such a short period of time there is still available in the storage container a sufficient quantity of well dried granulate or powder which is also warmed to the desired processing temperature.

The present invention is based on the recognition of the fact that, if the above conditions are satisfied, that is if the duration of the regeneration phase can be kept to a minimum, if the storage container has a sufficiently large capacity, and if it is well insulated, it is possible to eliminate the need for a separate regeneration circuit alternately including a separate additional adsorption chamber which is regenerated while the first-mentioned chamber is used for adsorbing moisture from the gaseous medium to be adsorption treated, and the first-mentioned adsorption chamber when the additional chamber is regenerated and the former chamber saturated with moisture. Namely, under these circumstances, the adsorption phase can be interrupted for the duration of the regeneration phase during which the adsorbent which has been previously saturated with moisture is regenerated.

In a currently preferred embodiment of the invention, the adsorption chamber is filled with two adsorbents, one of which is capable of adsorbing moisture only in a lower temperature range, while the other adsorbent is capable of adsorbing moisture across a broad temperature range, including the lower temperature range and a higher temperature range; these two adsorbents are arranged separately from one another, and are traversed by the respective media in succession. The regeneration temperatures needed for regeneration of these two adsorbents are also different, a temperature above the broad temperature range being needed for regenerating the broad temperature range adsorbent, and a temperature above the lower temperature range, and preferably within the higher temperature range, is needed for regenerating the lower temperature range adsorbent. For example, silica gel and molecular sieve can be used, silica gel being known as a lower temperature range adsorbent, while the molecular sieve is known as a broad temperature range adsorbent.

The advantages obtained by using the two adsorbents are manifold. First of all, even though only the molecular sieve adsorbent could be used to advantage, the silica gel adsorbent is substantially less expensive than the molecular sieve adsorbent. Thus, in a currently preferred embodiment of the invention, one third to one half of the molecular sieve adsorbent is replaced by the cheaper silica gel. While it is true that the later adsorbent material is capable of adsorbing moisture only within a relatively low temperature range, approximately up to 40°C, it can easily be regenerated at temperatures between 80° and 100°C. However, experience has shown that, when the gaseous medium, which has been previously dried and then used for drying the synthetic plastic granulate or powder in the storage container, is recirculated to the adsorption chamber to be again deprived of moisture and reutilized as the drying medium, the conditions are such that when the recirculated medium is relatively cold, it carries with it a substantial amount of moisture. This is caused by the fact that at that time the material to be dried, that is the synthetic plastic granulate or powder, is relatively wet so that most of the latent heat of the dried gaseous medium is spent on evaporating the moisture, so that the medium is recirculated in a relatively cool, high-moisture content condition. On the other hand, once the material in the storage container is sufficiently dry, the temperature thereof gradually rises, but simultaneously the moisture content thereof gradually decreases.

Consequently, when the drying medium is recirculated, it may be seen that so long as its temperature is low, that is so long as its moisture content is high, the moisture will be adsorbed therefrom predominantly by the relatively inexpensive and easily regeneratable silica gel. Once the temperature exceeds the upper limit of the adsorption capacity of the silica gel, the moisture is adsorbed only in the molecular sieve; however, as explained above, at this time the moisture content of the medium being recirculated is already relatively low so that less molecular sieve is needed to adsorb such moisture than would otherwise be necessary if the molecular sieve had to adsorb moisture from the recirculating medium across the entire broad temperature range.

Another advantage resulting from the use of the two adsorbents is that the time period necessary for regenerating the adsorbents is greatly reduced. This is due to the fact that only the molecular sieve adsorbent, the amount of which is smaller than that otherwise necessary due to the fact that a portion thereof has been replaced by the silica gel, has to be regenerated at the relatively high temperature of approximately 200°C. The heat content of the regeneration medium which exits from the molecular sieve at the separation plane of the two adsorbents to enter the silica gel is sufficiently high to cause the silica gel to regenerate by warming the same up to a temperature between 80° and 100°C. The net result of this is that no additional time interval is needed for regenerating the silica gel, since it is being regenerated simultaneously with the molecular sieve, so that the duration of the regeneration phase is substantially reduced. Consequently, the time period during which the drying process of the material in the storage container is interrupted is substantially shorter than if the entire adsorbent amount were constituted by the molecular sieve adsorbent.

When the two above-discussed adsorbents are used in a single adsorption chamber, a particularly advantageous embodiment of the present invention is obtained when the apparatus according to the invention includes, in addition to the single adsorption chamber with the two adsorbents, and to the storage container for the material to be dried, a plurality of conduits forming a closed adsorption circuit between the storage container and the adsorption chamber, in which a reversible blower is interposed, and when an opening is provided in the conduit section between the storage container and the blower, and another opening is provided in the conduit section between the storage container and the blower, which openings communicate with the ambient atmosphere during the regeneration phase and are closed by check valves during the adsorption phase of the apparatus, and when additional check valves are provided in the conduit sections between the above-mentioned openings and the storage container, which additional check valves are closed during the regeneration phase and open during the adsorption phase of the adsorption-regeneration cycle.

In this embodiment, the apparatus includes only one blower, one adsorption chamber, one heating arrangement, four simple check valves, three sensors and one filter.

In an even simpler embodiment of the present invention, the conduit has two ends, one of which communicates with the storage container, the other end communicating with the ambient temperature. In this embodiment, the conduit section communicating with the storage container for the material to be dried is provided with an opening communicating with the ambient atmosphere, and a check valve cooperates with this opening so as to close the same when the adsorption chamber is included in the adsorption phase, and to open the same when the adsorption chamber is to be included in the regeneration phase. Also, an additional check valve is provided in the conduit section between the aforementioned opening and the storage container, which is open during the adsorption phase and closed during the regeneration phase. In this embodiment, only two check valves are needed, and two sensors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
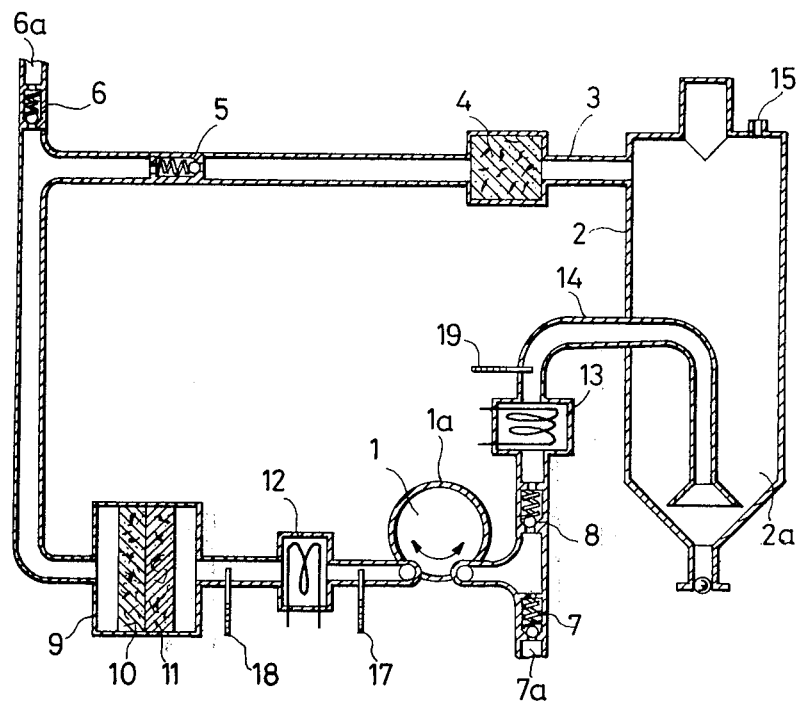
FIG. 1 is a diagrammatic view of a first embodiment of the apparatus according to the present invention.

Coming now to the drawings, and first to FIG. 1 thereof, it may be seen that it illustrates a first embodiment of the apparatus according to the invention, which includes a blower 1, an adsorption chamber 9 accommodating two different adsorbents 10 and 11, a heating arrangement 12, and a filter 4. Similar reference numerals will be used for similar parts throughout, that is also when describing the embodiments of FIGS. 2 and 3.

A storage container 2 for the material 2a to be dried, which is well known in the art and forms no part of the apparatus according to the present invention proper except that the gaseous medium treated in the apparatus of the invention is used therein, is included into a closed loop of conduits for conducting the gaseous medium to be treated. Four check valves 5, 6, 7 and 8 are provided in the conduits, the valves 6 and 7 being accommodated in conduit sections 6a and 7a communicating with the ambient atmosphere, while the valves 5 and 6 are accommodated in the closed loop. Two heating arrangements 12 and 13 are provided in the closed loop, between the adsorption chamber 9 and the blower 1, and between the check valve 8 and the storage container 2, respectively, while three sensors 18, 17 and 19 are arranged in the conduit sections between the adsorption chamber 9 and the heating arrangement 12, the latter and the blower 1, and in the conduit section 14 between the heating arrangement 13 and the storage container 2. A small venting opening 15 communicates the interior of the storage container 2 with the ambient atmosphere.

Having so described the arrangement of the various elements of the apparatus of the present invention, the operation thereof will now be discussed, during which discussion the apparatus will be continued in greater detail.

First of all, the operation of the apparatus during the adsorption phase will be discussed. The moist air to be dried in the apparatus is withdrawn by the action of the blower 1 from the storage container 2 through a conduit section 3 which communicates the storage container 2 with the filter 4, and from there through the check valve 5 which is in its open position into the chamber 9 which contains the two different adsorbents 10 and 11. The gaseous medium, that is the moist air, passes first through the adsorbent 10 which is capable of adsorbing moisture only in a lower temperature range, for instance, silica gel, and subsequently thereto, through the adsorbent 11 which is capable of adsorbing moisture in a broad temperature range, that is in the lower temperature range as well as in a higher temperature range, such as, for example, molecular sieve. After passing through the two adsorbents 10 and 11, the now demoisturized air passes through the heating arrangement 12 in which it is may be heated to a temperature needed for drying the material 2a, passes through the blower 1, being propelled thereby, flows through the then open check valve 8 and through the heating arrangement 13 which may be selectively energized in order to impart additional heat to the drying air, after which the demoisturized and heated air passes through the conduit section 14 into the storage container for the material 2a to be dried, for instance, synthetic plastic granulate or powder. In the storage container 2, the drying air flows through the interstices between the granules or powder particles, becomes remoisturized by accepting moisture from the material 2a, and reaches the vicinity of the conduit section 3 so that it can be recirculated. The small venting opening 15 in the lid of the storage container 2 assures that the pressure in the upper portion of the storage container 2 will approximate the pressure of the ambient atmosphere, that is the atmospheric pressure. As a result of this, it may be seen that during the above-described adsorption phase subatmospheric pressure will prevail in the conduits between the entrance into the conduit 3 and the blower 1, while superatmospheric pressure prevails downstream of the blower 1 and all the way through the conduit 14 and the material 2a. As a result of these pressure conditions, the check valves 6 and 7 will be in their closed positions, interrupting the communication of the conduits with the ambient atmosphere. Thus, during the adsorption phase, the only communication of the closed conduit loop with the ambient atmosphere will be through the small pressure-equalizing venting opening 15.

After a certain period of time during which the apparatus has been operated in the adsorption phase, for instance after 50 minutes, the direction of rotation of the blower 1 is reversed. This can be accomplished by means of a non-illustrated, conventional timing device. When the blower 1 now operates in the reversed direction, it creates subatmospheric pressure in the conduit section 14, which results in opening of the check valve 7 and closing of the check valve 8. The ambient air, which is drawn in through the conduit section 7a, passes through the heating arrangement 12 in which the air is heated to a regeneration temperature of approximately 200°C which is needed for the regeneration of the molecular sieve 11. The now heated air passes through the adsorption chamber 9 in a direction opposite to the direction in which the air being adsorption treated traversed the same, that is in countercurrent, first passing through the molecular sieve 11 and subsequently through the silica gel 10, regenerates the adsorbents 10 and 11 by liberating moisture therefrom, and eventually vents into the ambient atmosphere through the now open check valve 6 and the conduit 6a. As a result of the reversal of the direction of rotation of the blower 1, the pressure conditions in the conduits are also reversed, so that the check valves 5 and 8 in the conduit sections communicating with the storage container 2 are automatically closed. As a consequence of the fact that the check valves 5 and 8 are closed, no air can leave the storage container 2 or be pushed thereinto while the apparatus is operated in the regeneration phase. Consequently, the material 2a accommodated in the storage container 2 is not traversed by leakage air during the regeneration phase.

The temperature of the drying air is controlled during the adsorption phase by means of the sensor or thermostat 17. When temperatures above 100°C are required for drying the material 2a, which temperature is about the upper limit of what the blower 1 can withstand without losing its effectiveness of suffering damage, the additional heating arrangement 13 is energized and additionally heats the drying air passing therethrough in the conduit section which is downstream of the blower 1, and the operation thereof is controlled by means of the sensor or thermostat 19. Of course, when it is not contemplated that higher temperatures than 100°C are to be used, or when the blower 1 can withstand higher temperatures, the additional heating means 13 and the associated thermostat 19 can be omitted.

The desired temperature of the regeneration medium during the regeneration phase is controlled by means of the sensor or thermostat 18. This temperature should be about 10 to 20% higher than the desired final temperature of the upstream adsorbent 11.

Figure 2:
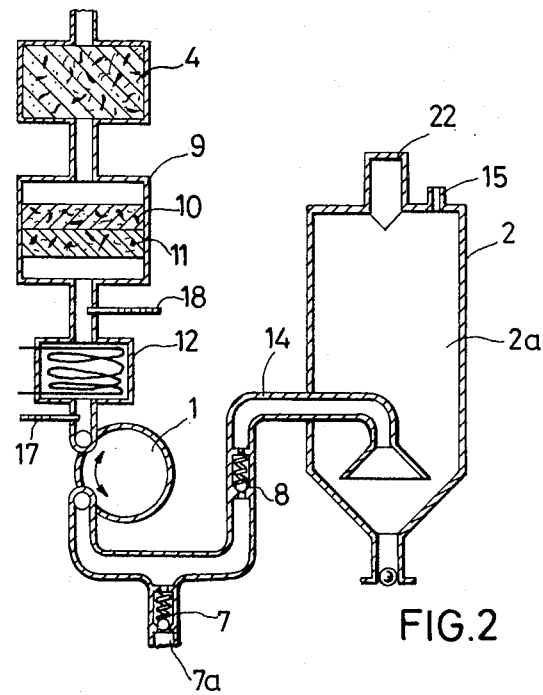
FIG. 2 is a diagrammatic view of a second embodiment of such apparatus.

FIG. 2 illustrates a simplified apparatus according to a second embodiment of the present invention, in which the closed loop circuit is omitted. The arrangement of the various elements of this embodiment, these elements being assigned the same reference numerals as in the embodiment of FIG. 1, will become apparent from the following description of the operation of this embodiment of the apparatus.

In this embodiment, when the blower 1 operates in one direction which results in an adsorption phase, the blower 1 propels the drying air through the then open check valve 8 into the storage container 2 in which the drying air accepts moisture from the material 2a and is vented into the ambient atmosphere through the opening 15. Since superatmospheric pressure prevails in the conduit section 14, the check valve 7 closes the conduit section 7a. Simultaneously therewith, ambient air is drawn by the blower 1 through the filter 4, this air being dried during its passage through the adsorbents 10 and 11, the dried air then being used as the drying air for the material 2a in the storage container 2. When the adsorbents 10 and 11 are saturated with moisture, the direction of operation of the blower 1 is reversed, which results in closing of the valve 8 and opening of the valve 7, so that ambient air enters the conduit 7a, passes through the heating arrangement 12, and regenerates the adsorbents 11 and 10, in succession, after which it is vented into the ambient atmosphere. Here again, thermostats 17 and 18 are provided which control the energization of the heating arrangement 12.

The advantage of this apparatus is to be seen in the fact that the check valves 5 and 6 can be omitted, and that the apparatus according to the present invention has to be connected with the storage container 2 only via a single conduit 14. However, under certain weather conditions, the ambient air may be more humid than the remoisturized air which exits from the storage container 2 and is conducted to the adsorption chamber 9 when the apparatus operates in a closed loop. Thus, under these circumstances, the adsorbents 10 and 11 have to adsorb more moisture than otherwise necessary. Furthermore, the latent heat of the air leaving the storage container after being remoisturized cannot be utilized, so that the energy comsumption is greater in this embodiment than in the others. So, while the initial cost of this apparatus is lower than those of the other embodiments, the operating costs are higher.

Figure 3:
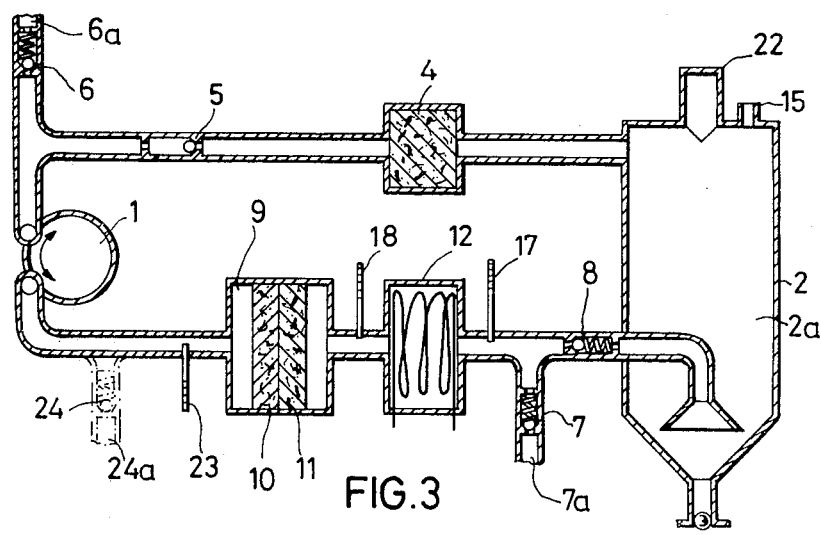
FIG. 3 is a diagrammatic view of a third embodiment of the apparatus.

FIG. 3 illustrates a further improvement of the apparatus according to FIG. 1. The most important difference between these two embodiments is to be seen in the fact that the blower 1 draws in, during the drying and adsorption phase, the relatively cool air from the storage container 2, and that this air is demoisturized and heated by the heating arrangement 12 only after having passed through the blower 1 and being propelled thereby. In this embodiment, is is possible to heat the drying air by means of a single heating arrangment 12 to for all intents and purposes arbitrarily high temperature, which was heretofore almost out of the question because of the fact that the relatively inexpensive and thus advantageous radial blowers can withstand only temperatures not exceeding 80°C. This fact necessitated the provision of the additional heating arrangement 13 in the embodiment of FIG. 1. However, the provision of the additional heating arrangement 13 was necessary if the apparatus were to be used for drying the materials in question, such as the synthetic plastic granulate or powder 2a, since these materials need to be heated to temperatures above 80° C in order to be dried and in condition for further processing. In the embodiment of FIG. 3, however, the additional heating arrangement 13 can be omitted.

The operation of the embodiment of FIG. 3 is similar to that described in connection with FIG. 1. Here again, the check valves 6 and 7 are closed during the adsorption phase and open during the regeneration phase, while the check valves 5 and 8 are open during the adsorption phase and closed during the regeneration phase, the closing and opening of the check valves 5, 6, 7 and 8 being caused by changes in the pressures prevailing in the respective conduit sections when the direction of operation of the blower 1 is reversed.

The embodiment of FIG. 3 can only be operated with the combination of the molecular sieve 11 or a similar broad temperature range adsorbent with the separate bed of the silica gel 10 or a similar lower temperature adsorbent, while the operation of the other embodiments with only the molecular sieve adsorbent is conceivable even though less economical. Namely, if the embodiment of FIG. 3 were operated only with the molecular sieve adsorbent 11, then the temperatures measured by a thermostat 23 between the adsorption chamber 9 and the blower 1 at the end of the regeneration phase would go so high as 200°C. This is due to the fact that the molecular sieve adsorbent 11 has to be heated to such a high temperature in order to rid the same of the adsorbed moisture and thus to regenerate the same. It has been already mentioned that the blower 1 is incapable of withstanding without damage temperatures exceeding approximately 80°C. On the other hand, for regenerating the silica gel bed 10, it is only necessary to raise the temperature thereof to approximately 70 to 80°C at the exit side thereof, which temperature is 30 30 to 20% lower than the temperature which the layer of the silica gel adjacent the separation plane from the molecular sieve reaches. Thus, the temperature of the medium reaching the blower 1 is always below the maximum temperature which the blower 1 can withstand, and close to the upper limit of this temperature range for only a short period of time immediately before the termination of the regeneration phase.

A further improvement of the operation of the apparatus can be achieved when the thermostat 23 is arranged as illustrated in FIG. 3, that is downstream of the silica gel adsorbent 10 during the regeneration phase. This thermostat can then be set to a temperature of 70° to 80°C so that, when this temperature is reached downstream of the silica gel adsorbent 10 during the regeneration phase, which temperature is indicative of the accomplishment of the regeneration phase, that is of the fact that all water has been removed from the adsorbents 10 and 11, the regeneration phase is terminated, so that it does not continue beyond what is necesssary for regeneration of the adsorbents 10 and 11. After the regeneration phase is terminated, the adsorbents are cooled for a short time, for instance, for 2 to 4 minutes --with a total regeneration time of 10 minutes -- in that the blower continues running in the same direction as during the regeneration phase while the heating arrangement 12 is deenergized, and upon the termination of the cooling phase, the direction of operation of the blower 1 is again reversed, this time into its original, adsorption-phase, direction, so that moisture is again adsorbed from the drying gaseous medium.

In order to further reduce the temperature of the gaseous medium passing through the blower 1, a branch duct 24a is provided which is controlled by a further check valve 24, which opens when the blower 1 operates in the direction of the regeneration phase, which branch duct 24a is illustrated in dash-dotted lines in FIG. 3 intermediate the blower 1 and the adsorption chamber 9 and communicates with the ambient atmosphere. The check valve 24 is so adjusted that, during the regeneration phase, about 10 to 50% of additional ambient air is drawn into the conduit section downstream of the adsorption chamber 9. Since the additional air is ambient air at room temperature, the temperature at the blower is lowered by 20 to 50%. Thus, this arrangement provides for an additional safeguard against overheating of the blower 1.

It will be understood that each of the elements described above, or two or more together, may also find a useful application in other types of adsorption apparatus differing from the types described above.

While the invention has been illustrated and described as embodied in an adsorption apparatus for drying synthetic plastic granulate in a storage container, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specifiic aspects of this invention.

What is claimed as new and desired to be protected by Letters Patent is set forth in the appended claims:

1. An apparatus for the adsorption treatment of a gaseous medium comprising, in combination, a single adsorption chamber having an inlet and an outlet and accommodating a regeneratable adsorbent intermediate said inlet and said outlet; conduit means communicating with said inlet and outlet, respectively; reversible blower means in said conduit means for propelling the gaseous medium to be treated through said adsorption chamber in direction from said inlet to said outlet when operating in one direction, and for propelling ambient air through said adsorption chamber in direction from said outlet to said inlet when operating in the reversed direction; and valve means in said conduit means for preventing the ambient air from entering the conduit means when said blower means operates in said one direction while permitting the gaseous medium to be treated to enter said conduit means, and vice versa said blower means operates in said reversed direction.

2. A combination as defined in claim 1, wherein said adsorption chamber also accommodates a different additional adsorbent, and wherein said adsorbents are separately arranged in said adsorption chamber intermediate said inlet and said outlet thereof so as to be traversed in succession by said gaseous medium to be treated, and in a reversed succession by the ambient air.

3. A combination as defined as claim 1, said conduit means includes an outlet conduit communicating said outlet with an inlet of a storage container; and further comprising a heating arrangement in said outlet conduit.

4. A combination as defined in claim 1, wherein said conduit means includes an inlet conduit communicating said inlet with the ambient atmosphere, and an outlet conduit communicating said outlet with an inlet of a storage container for a material to be dried by the treated gaseous medium; and further comprising a heating arrangement in said outlet conduit intermediate said adsorption chamber and the storage container; wherein said blower means is located in said outlet conduit intermediate said heating arrangement and the storage container; and wherein said valve means includes a first valve in said outlet conduit intermediate said blower means and the storage container and cooperating with an opening communicating the outlet conduit with the ambient atmosphere and being closed while said blower means operates in said one direction and open when said blower means operates in said reversed direction, and a second valve in said outlet conduit intermediate said first valve and the storage container and operative for interrupting communication between said blower means and the storage container when said blower means operates in said reversed direction, and for permitting such communication when said blower means operates in said one direction.

5. A combination as defined in claim 1, and further comprising heating means in said conduit means and operative for increasing the temperature of the medium to be treated and of the regeneration medium when energized; and thermostat means in said conduit means for controlling the energization of said heating means in dependence on the temperature of the medium to be treated and of the ambient air, respectively.

6. A combination as defined in claim 2, wherein the adsorbent first traversed by said gaseous medium to be treated is a lower temperature range adsorbent, and wherein the other adsorbent is a broad temperature adsorbent.

7. A combination as defined in claim 6, wherein said first-mentioned adsorbent is a silica gel adsorbent, and wherein said other adsorbent is a molecular sieve adsorbent.

8. An apparatus for the adsorption treatment of a gaseous medium comprising, in combination, a single adsorption chamber having an inlet and an outlet and accommodating a regeneratable adsorbent intermediate said inlet and said outlet; conduit means including an inlet conduit communicating said inlet with an outlet of a storage container for a material to be dried by the treated gaseous medium, and an outlet conduit communicating said outlet with an inlet of the storage container; a heating arrangement in said outlet conduit; reversible blower means in said conduit means for propelling the gaseous medium to be treated through said adsorption chamber in direction from said inlet to said outlet when operating in one direction, and for propelling a gaseous regeneration medium through said adsorption chamber in direction from said outlet to said inlet when operating in the reversed direction; and valve means including a first check valve in said outlet conduit, a second check valve in said inlet conduit, said first and second valves cooperating with respective openings communicating the respective conduits with the ambient atmosphere and being open while said blower means operates in said reversed direction, a third check valve in said outlet conduit intermediate said first check valve and the storage container, and a fourth check valve in said inlet conduit intermediate said second check valve and the storage container, said third and fourth check valves being operative for interrupting communication between said blower means and the storage container when said blower means operates in said reversed direction, and for permitting such communication when said blower means operates in said one direction, said valve means being operative for preventing the regeneration medium from entering the conduit means when said blower means operates in said one direction while permitting the gaseous medium to be treated to enter said conduit means, and vice versa when said blower means operates in said reversed direction.

9. A combination as defined in claim 8, wherein said heating arrangement is situated in said outlet conduit intermediate said adsorption chamber and said blower means; and further comprising an additional heating arrangement in said outlet conduit intermediate said blower means and the storage container.

10. A combination as defined in claim 8, wherein said blower means is situated in said inlet conduit; and further comprising a branch duct communicating said inlet conduit with the ambient atmosphere intermediate said adsorption chamber and said blower means, and a check valve in said branch duct and operative for interrupting the communication with the ambient atmosphere when said blower means operates in said one direction, and for admitting additional ambient air into the inlet conduit in such a quantity that approximately 20 to 50% of the air propelled by the blower means when operating in said reversed direction is constituted by such additional air.

11. In an arrangement for drying synthetic plastic particles, a combination comprising a storage container for the particles to be dried; an adsorption chamber for removing moisture from air to be used for drying the particles; conduit means connecting said storage container to said adsorption chamber; reversible blower means in said conduit means and operative for propelling the drying air into said storage container when operating in one direction and for propelling heat ambient air through said adsorption chamber when operating in a reversed direction; and valve means in said conduit means and operative for admitting the ambient air into said conduit means when said blower means operates in the reversed direction while simultaneously interrupting communication between said blower means and said storage container so that the adsorption chamber can be regenerated, and for interrupting communication between the ambient air and the conduit means when said blower means operates in said one direction while simultaneously establishing communication of said blower means with said storage container.

12. An apparatus for the adsorption treatment of a gaseous medium comprising, in combination, a single adsorption chamber accommodating a first body of a low temperature range adsorbent and a second body of a broad temperature range adsorbent; conduit means communicating with said adsorption chamber; reversible blower means in said conduit means for propelling the gaseous medium to be treated in succession through said first and said second body in said adsorption chamber when operating in one direction, and for propelling a gaseous regeneration medium in reversed succession through said second and said first body when operating in a reversed direction; heating means in said conduit means and operative for increasing the temperature of the medium to be treated and of the regeneration medium when energized; and valve means in said conduit means for preventing the regeneration medium from entering said conduit means when said blower means operates in said one direction while permitting the gaseous medium to be treated to enter said conduit means, and vice versa when said blower means operates in said reversed direction.

* * * * *